United States Patent Office 3,090,754
Patented May 21, 1963

3,090,754
POLYSILOXANE LUBRICANT COMPOSITIONS
Harry M. Schiefer, Midland, Mich., assignor to Dow Corning Corporation, Midland, Mich., a corporation of Michigan
No Drawing. Filed Feb. 26, 1958, Ser. No. 717,574
2 Claims. (Cl. 252—49.7)

This invention relates to lubricants comprising mixtures of bromophenysiloxanes and certain organotin compounds.

It is known from U.S. Patent 2,599,984 that siloxanes containing halogenated phenyl radicals are superior to hydrocarbon substituted siloxanes for lubrication of moving metallic parts. However, with the continuing demand for lubricants which are operated at increasingly high temperatures and under heavy load, it has been found that the halogenated phenylsiloxanes heretofore employed were not suitable for many of the more extreme conditions under which lubrication is required.

It is the object of this invention to provide new siloxane compositions which give superior lubricity without sacrificing the other desirable properties of siloxane lubricants such as low freezing point, high temperature stability and relatively small changes in viscosity with temperature. Other objects and advantages will be apparent from the following description.

This invention relates to compositions of matter comprising (1) a fluid copolymeric siloxane having both dibromophenyl and methyl radicals attached to the silicon atoms thereof, any remaining organic radicals attached to the silicon atoms in said copolymer being phenyl radicals, in said siloxane at least 50% of the total organic radicals being methyl and the dibromophenyl radicals being present in amount such that there is from 6 to 25% by weight bromine in the copolymer and (2) a tin compound of the group consisting of polymers of the unit formula

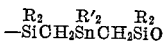

copolymers of the unit formula

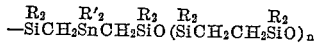

and compounds of the formulae $[R_3SiCH_2]_2SnR'_2$, $[R_3SiO]_2SnR'_2$ and

in which tin compounds R is phenyl or methyl, $n$ is an integer of at least 1 and R' is an alkyl radical of less than 6 carbon atoms or a phenyl radical, (2) being present in amount such that there is from .5 to 2% by weight tin in the combined weights of (1) and (2).

For the purpose of this invention, siloxanes (1) employed in this invention are copolymeric fluid siloxanes containing both dibromophenylsiloxane units and methylsiloxane units. The dibromophenylsiloxane units can be any of the following: mono-dibromophenylsiloxane, (i.e. $Br_2$

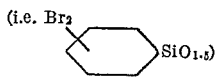

dibromophenylmethylsiloxane, (i.e. $Br_2$

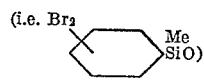

dibromophenyldimethylsiloxane, dibromophenylphenylsiloxane, dibromophenyldiphenylsiloxane and dibromophenylphenylmethylsiloxane. For the purpose of this invention the position of the bromine atoms relative to the silicon is not critical. For example, the bromine atoms can be in the 2, 3 positions, the 2, 4 positions, the 2, 5 positions, the 2, 6 positions, the 3, 4 positions or the 3, 5 positions.

The remaining siloxane units in the copolymer can be of the following types: monomethylsiloxane, dimethylsiloxane, trimethylsiloxane, monophenylsiloxane, diphenylsiloxane, triphenylsiloxane, phenylmethylsiloxane, phenyldimethylsiloxane and diphenylmethylsiloxane. These units can be present in any combination provided that the resulting copolymer is a fluid and provided that at least 50% of the total number of organic radicals (that is the total number of methyl plus phenyl plus dibromophenyl radicals) are methyl radicals. It has been found that inferior lubrication takes place when the amount of dibromophenyl radicals in the copolymer is such that the percent by weight bromine is less than 6 and more than 25%.

Dibromophenylsiloxanes are best prepared by brominating phenyltrichlorosilane with elemental bromine in the presence of an iron catalyst to give dibromophenyltrichlorosilane. If it is desired to place phenyl or methyl groups on the same silicon with the dibromophenyl group this is best done by reacting the dibromophenyltrichlorosilane with the corresponding Grignard reagents. The copolymers of this invention are best prepared by cohydrolyzing the dibromophenylchlorosilanes with methyl- and phenylchlorosilanes.

The tin compositions of this invention (2) can be homopolymeric compounds of the unit formula

These compounds are best prepared by reacting at a temperature below 40° C. a dialkyltindihalide of the formula $R'_2SnX_2$ with a Grignard reagent of the formula

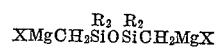

where R is phenyl or methyl and X is a halogen atom. This reaction can be carried out in the conventional manner for reacting Grignard reagents with tin halides. For the purpose of this invention it is not necessary to purify the reaction product except that it is desirable to wash out any hydrolyzable halogen.

In addition, compound (2) can be copolymers which contain both units of the formula

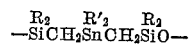

and units of the formula

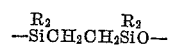

These copolymers can be prepared by carrying out the reaction between Mg and

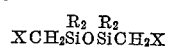

under conditions which cause intermolecular condensation of the Wurtz type to produce polymers of the formula

where $n$ is an integer of at least 1. This intermolecular condensation is best obtained by carrying out the reaction at temperatures above 40° C. These polymers are then reacted with the dialkyltindihalide to give copolymers having varying ratios of

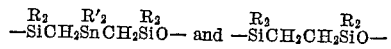

units depending upon the value of $n$. For the purpose of this invention it is preferred that these ratios range from 1:1 to 1:10 although copolymers having higher ratios can be employed if desired.

It should be understood that the above tin containing polymers and copolymers can be used separately or in admixture of any number of species.

The tin compounds (2) can also be monomeric materials of the formula $[R_3SiCH_2]_2SnR'_2$ and $$[R_3SiOSiCH_2]_2SnR'_2$$
    with $R_2$ above the middle Si These compounds are best prepared by reacting Grignard reagents of the formulae $R_3SiCH_2MgX$ or $$R_3SiOSiCH_2MgX$$
    with $R_2$ above the middle Si respectively, with a dialkyltindihalide. In addition, the monomeric tin compounds can have the formula $$[R_3SiO]_2SnR'_2$$

These compounds may be prepared by various methods but the best method is that of reacting on a steam bath a silanol of the formula $R_3SiOH$ with a dialkyltinoxide in a solvent such as carbon tetrachloride.

For the purpose of this invention the R groups attached to the silicon atoms can be phenyl or methyl and the R' groups attached to the tin atoms can be phenyl or any alkyl radical of less than 6 carbon atoms such as methyl, ethyl, propyl, isopropyl, butyl, secondary butyl, tertiary butyl and amyl.

The dialkyltindihalides employed in the production of the compositions of this invention are commercially available materials.

The compositions of this invention are prepared by merely mixing ingredients (1) and (2). In order to obtain the superior lubricity of this invention compound (2) should be employed in amount such that the percent by weight tin in the combined weights of (1) and (2) is from 0.5 to 2% inclusive. It should be understood, of course, that a mixture of two or more of the above-defined tin compounds can be employed in any composition.

The compositions of this invention are particularly useful for the lubrication of moving metallic parts in hydraulic pumps. Their superiority over other siloxane lubricants is particularly evident at high loads. They can be employed either per se as fluids or they can be first thickened to produce greases.

The compositions of this invention can be thickened into greases with any of the conventional thickening agents which are employed with siloxane greases. These include carbon black, lithium salts of carboxylic acids such as lithium stearate and lithium-12-hydroxystearate; alkali metal and alkaline earth metal salts of alicyclic substituted fatty acids such as cyclohexylacetic, cyclohexylpropionic, cyclohexylbutyric, gamma ethylcyclohexylbutyric, alpha 4-ditertiarybutylcyclohexylbutyric, 2-cyclohexenecaproic, pentalaneacetic and cyclophenylvaleric; substituted ureas of the formula YNHCONHY in which Y is an alkyl radical such as methyl, ethyl or octadecyl; aryl ureas of the formula YNHCONHY where Y is an aryl radical such as phenyl, tolyl and xenyl and aryl-carbamyl compounds melting above 250° C. such as compounds of the formula YCONHY and YNHCONHY'NHCONHY in which Y is an aryl radical such as phenyl, tolyl, and xenyl and Y' is an arylene radical such as phenylene and xenylene.

The greases made from the compositions of this invention can be compounded in accordance with any of the conventional methods used for making silicone greases.

In addition to thickening agents the greases of this invention may contain other ingredients normally added to siloxane lubricants such as oxidation inhibitors.

The lubricating qualities of the compositions shown in the following examples were all determined on the Shell 4-ball wear testing machine. In this test a ½ inch steel ball is rotated against three stationary ½ inch steel balls at a rate of 1200 r.p.m. at a temperature of 400° F. under a load of 40 kilograms for 2 hours. At the end of this time the length and width of the scar formed on each stationary ball is determined and the average of these six measurements is taken as the scar diameter and reported in millimeters.

The following examples are illustrative only and should not be construed as limiting the invention which is properly delineated in the appended claims. In the following examples and claims the following abbreviations are used: Me for methyl, Bu for butyl and Ph for phenyl.

Example 1

This example shows the superiority of the compositions of this invention as antiwear and high pressure lubricants for sliding steel surfaces over dibromophenylsiloxane containing fluids which have no tin additives and over the corresponding chlorophenyl fluids which contain an identical tin additive. Each of the compositions shown below contain 3% by weight of a fluid containing 18.9% by weight tin. This fluid was a mixture of copolymers composed of units of the formulae

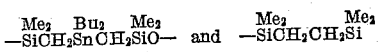

(1) A 30 cs. fluid copolymer of 20 mol percent dichlorophenyldimethylsiloxane and 80 mol percent dimethylsiloxane.
(2) A 50 cs. fluid copolymer of 88.1 mol percent dimethylsiloxane, 8.7 mol percent trimethylsiloxane and 3.2 mol percent mono-tetrachlorophenylsiloxane.
(3) A 50 cs. fluid copolymer of 15 mol percent trimethylsiloxane, 81.3 mol percent dimethylsiloxane and 3.7 mol percent mono-dibromophenylsiloxane.

Each composition was tested on the Shell 4-ball tester as shown above and the results were as follows.

| Composition: | Scar diameter in mm. |
|---|---|
| Blank [1] | >2 |
| 1 | 1.2 |
| 2 | 1.35 |
| 3 | .9 |

[1] Identical with composition 3 except that no tin additive was present.

Example 2

The tin additive employed in this example was made by reacting dimethyltindichloride with the reaction product of magnesium and $ClCH_2SiMe_2OSiMe_2CH_2Cl$. The resulting product contained 24.55% by weight tin indicating that it was a mixture of copolymers containing units of the formula $$-SiCH_2SnCH_2SiO-\text{ and }SiCH_2CH_2SiO$$
(with $Me_2$ groups above each Si and Sn)

in the approximate ratio of 1:1.

3% by weight of this tin copolymer was added to a 50 cs. fluid copolymer of 15 mol percent trimethylsiloxane, 81.3 mol percent dimethylsiloxane and 3.7 mol percent mono-dibromophenylsiloxane. The resulting mixture was tested for lubricity as shown above and the scar diameter was .89 mm.

Example 3

Each of the following tin compounds was added to the siloxane copolymer fluid of Example 2 in the amounts indicated and the lubricity of the mixture was determined by the above test. The results were as follows:

| Percent by wt. of tin compound based on total wt. of siloxane and tin compound | Formula of tin compound | Scar diameter in mm. |
|---|---|---|
| 3 | $[Me_3SiO]_2SnBu_2$ | 1.00 |
| 3 | $[Me_3SiCH_2]_2SnBu_2$ | 1.07 |
| 4 | $[PhMe_2SiCH_2]_2SnMe_2$ | .86 |
| 4 | $[Me_3SiOSiCH_2]_2SnMe_2$ (with Me branch) | .94 |

Example 4

3% by weight of a copolymeric tin compound of the unit formulae $$\underset{\text{Si CH}_2\text{Sn CH}_2\text{SiO}}{\text{Me}_2 \quad \text{Bu}_2 \quad \text{Me}_2} \text{ and } \underset{\text{Si CH}_2\text{CH}_2\text{SiO}}{\text{Me}_2 \quad \quad \text{Me}_2}$$

in which copolymer there was 18.9% by weight tin, was mixed with a fluid copolymer of the composition 4.5 mol percent dibromophenyldimethylsiloxane, 4.94 mol percent phenylmethylsiloxane and 90.56 mol percent dimethylsiloxane. This siloxane copolymer had a viscosity of 107 cs. at 100° F.

The mixture was tested on the Shell 4-ball machine as shown above and a scar diameter was found to be 1.00 mm.

Example 5

3% by weight of a copolymeric tin compound having units of the formula $$\underset{\text{SiCH}_2\text{SnCH}_2\text{SiO}}{\text{Me}_2 \quad \text{Bu}_2 \quad \text{Me}_2}$$

and units of the formula $$\underset{\text{SiCH}_2\text{CH}_2\text{SiO}}{\text{Me}_2 \quad \quad \text{Me}_2}$$

which copolymer contained 18.9% by weight tin, was mixed with a 161 cs. fluid copolymer of a composition 8 mol percent mono-dibromophenylsiloxane, 77 mol percent dimethylsiloxane and 15 mol percent trimethylsiloxane. The mixture was tested as shown above and the scar diameter was found to be .99 mm.

Example 6

Equivalent results are obtained when 3% by weight of the following tin compounds are used in the siloxane fluid of Example 2:

$$\underset{-\text{SiCH}_2\text{SnCH}_2\text{SiO}-}{\text{Ph}_2 \quad \text{Me}_2 \quad \text{Ph}_2}$$

$$\underset{-\text{SiCH}_2\text{SnCH}_2\text{SiO}-}{\text{Me}_2 \quad \text{Ph}_2 \quad \text{Me}_2}$$

$$[\text{Ph}_3\text{SiO}]_2\text{Sn}[\text{CH}(\text{CH}_3)_2]_2$$

Example 7

Equivalent results are obtained when a mixture of 3% by weight [Me$_3$SiCH$_2$]$_2$SnMe$_2$ and 97% by weight of a siloxane copolymer fluid of the composition 5 mol percent dibromophenylmethylsiloxane, 5 mol percent diphenylsiloxane, 1 mol percent monomethylsiloxane, 10 mol percent phenyldimethylsiloxane and 79 mol percent dimethylsiloxane is employed as a lubricant for steel surfaces.

That which is claimed is:

1. A composition of matter consisting essentially of (1) a fluid copolymeric siloxane having dibromophenyl and methyl groups attached to the silicon atoms thereof, there being no more than one dibromophenyl radical attached to any one silicon atom, any remaining organic radicals attached to the silicon atoms in said copolymer being phenyl, in said copolymer at least 50% of the total organic radicals being methyl and the dibromophenyl radicals being present in amount such that there is from 6 to 25% by weight bromine in the copolymer and (2) a tin compound selected from the group consisting of polymers of the unit formula $$\underset{-\text{SiCH}_2\text{SnCH}_2\text{SiO}}{\text{R}_2 \quad \text{R}'_2 \quad \text{R}_2}$$

copolymers of the unit formula $$\underset{-\text{SiCH}_2\text{SnCH}_2\text{SiO}[\text{SiCH}_2\text{CH}_2\text{SiO}]_n}{\text{R}_2 \quad \text{R}'_2 \quad \text{R}_2 \quad \text{R}_2 \quad \quad \text{R}_2}$$

and compounds of the formulae [R$_3$SiCH$_2$]$_2$SnR$'_2$, $$\underset{[\text{R}_3\text{SiO}\overset{}{\text{SiCH}_2}]_2\text{SnR}'_2}{\text{R}_2}$$

and [R$_3$SiO]$_2$SnR$'_2$, in which tin compounds R is selected from the group consisting of phenyl and methyl radicals, $n$ is an integer of at least 1 and R' is of the group consisting of phenyl and alkyl radicals of less than 6 carbon atoms, (2) being present in amount such that there is from .5 to 2% by weight tin in the combined weights of (1) and (2).

2. A composition in accordance with claim 1 wherein the copolymeric siloxane is a copolymer of monodibromophenylsiloxane, dimethylsiloxane and trimethylsiloxane and the tin compound is of the formula $$\underset{-\text{SiCH}_2\text{SnCH}_2\text{SiO}[\text{SiCH}_2\text{CH}_2\text{SiO}]_n}{\text{Me}_2 \quad \text{Me}_2 \quad \text{Me}_2 \text{Me}_2 \quad \quad \text{Me}_2}$$

where $n$ has a value from 0 to 10 inclusive and Me is methyl.

References Cited in the file of this patent

UNITED STATES PATENTS

| | | |
|---|---|---|
| 2,599,984 | Fletcher et al. | June 10, 1952 |
| 2,937,994 | Holdstock | May 24, 1960 |
| 2,937,995 | Holdstock et al. | May 24, 1960 |